(12) United States Patent
Jeong et al.

(10) Patent No.: US 11,362,602 B2
(45) Date of Patent: Jun. 14, 2022

(54) MOTOR CONTROL APPARATUS AND METHOD

(71) Applicant: HYUNDAI MOBIS CO., LTD., Seoul (KR)

(72) Inventors: Hyeon Hee Jeong, Yongin-si (KR); Kyu Ha Kim, Yongin-si (KR); In Hyuk Kim, Yongin-si (KR); Jeong Hoon Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 221 days.

(21) Appl. No.: 16/713,992

(22) Filed: Dec. 13, 2019

(65) Prior Publication Data

US 2020/0235679 A1      Jul. 23, 2020

(30) Foreign Application Priority Data

Jan. 22, 2019   (KR) .......................... 10-2019-0007995

(51) Int. Cl.
  *H02P 6/16*    (2016.01)
  *H02P 5/74*    (2006.01)
  (Continued)

(52) U.S. Cl.
  CPC .............. *H02P 6/10* (2013.01); *B62D 5/0472* (2013.01); *H02P 23/0022* (2013.01);
  (Continued)

(58) Field of Classification Search
  CPC .................................... H02P 21/22; H02P 6/10
  See application file for complete search history.

(56) References Cited

U.S. PATENT DOCUMENTS 9,419,550 B2 *   8/2016   Kim ..................... H02P 21/06
2009/0284195 A1 * 11/2009 Gallegos-Lopez ... B60L 15/025
                                                              318/400.02
(Continued)

FOREIGN PATENT DOCUMENTS

JP      2013-126342 A    6/2013
KR   10-2006-0120015 A   11/2006
(Continued)

OTHER PUBLICATIONS

Office Action of Korean Patent Application No. 10-2019-0007995—5 pages (dated Sep. 11, 2020).

*Primary Examiner* — Muhammad S Islam
*Assistant Examiner* — Charles S Laughlin
(74) *Attorney, Agent, or Firm* — DLA Piper LLP (US)

(57) ABSTRACT

Disclosed herein are a motor control apparatus and method. The motor control apparatus includes a compensation signal generator configured to apply a DC-Link voltage ($V_{Link}$) for driving a motor to a parameter map preset in order to estimate a gain and phase of a motor torque ripple generated when the motor is driven according to a motor command current and a motor rotation speed, and to generate a compensation signal ($i_{comp}$) for compensating for the motor torque ripple corresponding to a current input motor command current ($i_q^*$), motor rotation speed ($\omega_m$), and DC-Link voltage ($V_{Link}$), and a current controller configured to control the current of the motor by controlling an inverter such that a compensation command current ($i_q^*{}_{\_comp}$), generated by reflecting the compensation signal ($i_{comp}$) in the motor command current ($i_q^*$), coincides with a motor drive current ($i_q$) supplied to the motor from the inverter.

16 Claims, 20 Drawing Sheets

(51) Int. Cl.
    *H02P 23/18*     (2016.01)
    *H02P 6/10*     (2006.01)
    *B62D 5/04*     (2006.01)
    *H02P 27/06*     (2006.01)
    *H02P 23/00*     (2016.01)
    *H02P 23/14*     (2006.01)
    *H02P 23/10*     (2006.01)

(52) U.S. Cl.
    CPC .......... *H02P 23/0086* (2013.01); *H02P 23/10* (2013.01); *H02P 23/14* (2013.01); *H02P 27/06* (2013.01)

(56) References Cited

U.S. PATENT DOCUMENTS

| | | | |
|---|---|---|---|
| 2014/0265961 A1* | 9/2014 | Gebregergis | H02P 6/10 318/400.23 |
| 2019/0158004 A1* | 5/2019 | Pramod | H02P 6/10 |

FOREIGN PATENT DOCUMENTS

| | | |
|---|---|---|
| KR | 10-2010-0084439 A | 7/2010 |
| KR | 10-2016-0098890 A | 8/2016 |

\* cited by examiner (a) lower voltage (b) upper voltage

MOTOR CONTROL APPARATUS AND METHOD

CROSS-REFERENCE TO RELATED APPLICATION

The present application claims priority under 35 U.S.C. § 119(a) to Korean Patent Application No. 10-2019-0007995, filed on Jan. 22, 2019 in the Korean Intellectual Property Office, which is incorporated herein by reference in its entirety.

BACKGROUND

1. Technical Field

Embodiments of the present disclosure relate to a motor control apparatus and method, and more particularly, to a motor control apparatus and method for reducing a motor torque ripple generated when a motor is driven.

2. Related Art

A motor-driven power steering (hereinafter, referred to as "MDPS") for a vehicle is a device that facilitates steering by providing some of steering torque, applied to a steering wheel by a user, using an auxiliary power source when the vehicle is steered. The MDPS determines a vehicle driving condition through a column torque sensor for measuring a driver's column torque input to a steering wheel, a steering angle sensor for measuring a steering angle or steering angular velocity of the steering wheel, a vehicle speed sensor for measuring a vehicle speed, etc., and provides an auxiliary torque through an electric motor (MDPS motor) based on the column torque applied to a steering shaft as the driver steers the steering wheel.

Typically, the MDPS motor is implemented as a three-phase AC motor, and an MDPS ECU controls the driving of the MDPS motor by receiving feedback on the current of each phase output to the MDPS motor and controlling an inverter through proportional integral (PI) control to output a three-phase alternating current.

Meanwhile, when the MDPS motor is driven, a torque ripple may be generated due to the mechanical structure of the motor according to the number of poles of a rotor or the number of slots of a stator. That is, an 18th order torque ripple is generated based on a mechanical angle in a 6-pole 9-slot motor, and a 24th order torque ripple is generated based on a mechanical angle and a 6th order torque ripple is generated based on an electric angle in an 8-pole 12-slot motor. These motor torque ripples cause a reduction in noise, vibration, and harshness (NVH) performance of the MDPS, so that an improvement thereof is required.

The related art of the present invention is disclosed in Korean Patent Application Publication No. 10-2016-0098890 (published on Feb. 11, 2015).

SUMMARY

Various embodiments are directed to a motor control apparatus and method for improving noise, vibration, and harshness (NVH) performance of an MDPS by suppressing a motor torque ripple generated when an MDPS motor is driven.

In an embodiment, there is provided a motor control apparatus that includes a compensation signal generator configured to apply a DC-Link voltage ($V_{Link}$) for driving a motor to a parameter map preset in order to estimate a gain and phase of a motor torque ripple generated when the motor is driven according to a motor command current and a motor rotation speed for driving the motor, and to generate a compensation signal ($i_{comp}$) for compensating for the motor torque ripple corresponding to a current input motor command current ($i_q^*$), motor rotation speed ($\omega_m$), and DC-Link voltage ($V_{Link}$), and a current controller configured to control the current of the motor by controlling an inverter such that a compensation command current ($i_q^*{}_{\_comp}$), which is generated by reflecting the compensation signal ($i_{comp}$) generated by the compensation signal generator in the motor command current ($i_q^*$), coincides with a motor drive current ($i_q$) supplied to the motor from the inverter operated based on the DC-Link voltage.

The parameter map may be preset in consideration of the frequency response characteristic of the current controller, so as to prevent a gain reduction and phase delay of the compensation signal ($i_{comp}$) reflected in the compensation command current ($i_q^*{}_{\_comp}$) due to the frequency response characteristic of the current controller in a high-speed rotation region of the motor.

The parameter map may be acquired by, for each motor rotation speed, repeatedly performing a process of constantly maintaining the motor rotation speed and the motor command current input to the current controller, a process of acquiring a phase of a motor torque ripple model when the magnitude of the motor torque ripple, which is measured when the motor torque ripple is modeled to vary the phase of the motor torque ripple model reflected in the motor command current, is minimum, and a process of acquiring a gain of the motor torque ripple model when the magnitude of the motor torque ripple, which is measured when the gain of the motor torque ripple model is varied while the phase of the motor torque ripple model is kept constant with the acquired phase, is minimum.

The parameter map may include a first parameter map for estimating the gain and phase of the motor torque ripple at a lower limit of the DC-Link voltage for normally driving the motor, and a second parameter map for estimating the gain and phase of the motor torque ripple at an upper limit of the DC-Link voltage for normally driving the motor.

The compensation signal generator may determine a gain (A) for generating the compensation signal ($i_{comp}$) by extracting a first gain map according to the motor rotation speed from the first parameter map, extracting a second gain map according to the motor rotation speed from the second parameter map, and interpolating the extracted first and second gain maps through the DC-Link voltage ($V_{Link}$).

The compensation signal generator may determine a phase ($\varphi$) for generating the compensation signal ($i_{comp}$) by interpolating the first and second parameter maps through the DC-Link voltage ($V_{Link}$) in order to consider a change in a knee-point depending on the change in the DC-Link voltage, and the knee-point is a motor rotation speed at which flux weakening control of the motor is started.

The compensation signal generator may determine the phase ($\varphi$) for generating the compensation signal ($i_{comp}$) by extracting a first phase map according to the motor rotation speed from the first parameter map, extracting a second phase map according to the motor rotation speed from the second parameter map, and interpolating the extracted first and second phase maps through the DC-Link voltage ($V_{Link}$).

When the DC-Link voltage ($V_{Link}$) is between the lower limit and the upper limit when the motor rotation speed ($\omega_m$) is in a range between a knee-point ($NP_{lo}$) of the first phase map and a knee-point ($NP_{up}$) of the second phase map, the compensation signal generator may determine the phase ($\varphi$) for generating the compensation signal ($i_{comp}$) by determining a phase value ($\varphi_1$) corresponding to the DC-Link voltage ($V_{Link}$) at the knee-point ($NP_{up}$) by linearly interpolating a phase value ($\varphi_{lo}$) at the knee-point ($NP_{lo}$) of the first phase map and a phase value ($\varphi_{up}$) at the knee-point ($NP_{up}$) of the second phase map through the DC-Link voltage ($V_{Link}$), determining a phase value ($\varphi_2$) at the point determined by linearly interpolating a phase value ($\varphi_{lo}'$) at the knee-point ($NP_{lo}$) of the first phase map and a phase value ($\varphi_{up}'$) at the knee-point ($NP_{up}$) of the second phase map through the DC-Link voltage ($V_{Link}$), and interpolating the determined phase values ($\varphi_1$ and $\varphi_2$).

In an embodiment, there is provided a motor control method that includes a compensation signal generator applying a DC-Link voltage ($V_{Link}$) for driving a motor to a parameter map preset in order to estimate a gain and phase of a motor torque ripple generated when the motor is driven according to a motor command current and a motor rotation speed for driving the motor, and generating a compensation signal ($i_{comp}$) for compensating for the motor torque ripple corresponding to a current input motor command current ($i_q^*$), motor rotation speed ($\omega_m$), and DC-Link voltage ($V_{Link}$), and a current controller controlling the current of the motor by controlling an inverter such that a compensation command current ($i_q^*{}_{-comp}$), which is generated by reflecting the compensation signal ($i_{comp}$) generated by the compensation signal generator in the motor command current ($i_q^*$), coincides with a motor drive current ($i_q$) supplied to the motor from the inverter operated based on the DC-Link voltage.

As apparent from the above description, according to exemplary embodiments of the present invention, by generating the compensation signal for compensating for the motor torque ripple based on the parameter map set in consideration of the frequency response characteristic of the current controller for controlling the MDPS motor to reversely compensate for the motor command current, it is possible to secure motor control performance that is not affected by the frequency response characteristic of the current controller by preventing the gain reduction and phase delay of the compensation signal from occurring in the high-speed rotation region of the motor.

In addition, according to exemplary embodiments of the present invention, in order to compensate for the phenomenon in which phase delay characteristics are changed due to the change in the knee-point at which the flux weakening control of the motor is started according to the DC-Link voltage required for driving the motor, a configuration is adopted in which the compensation signal is generated by interpolating the parameter map according to the DC-Link voltage. Therefore, it is possible to improve phase accuracy during the control of the motor.

DETAILED DESCRIPTION

Hereinafter, a motor control apparatus and method according to the present invention will be described below in detail with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the invention and may change depending on the intention or practice of a user or an operator. Therefore, these terms should be defined based on the overall disclosures set forth herein.

Figure 1:
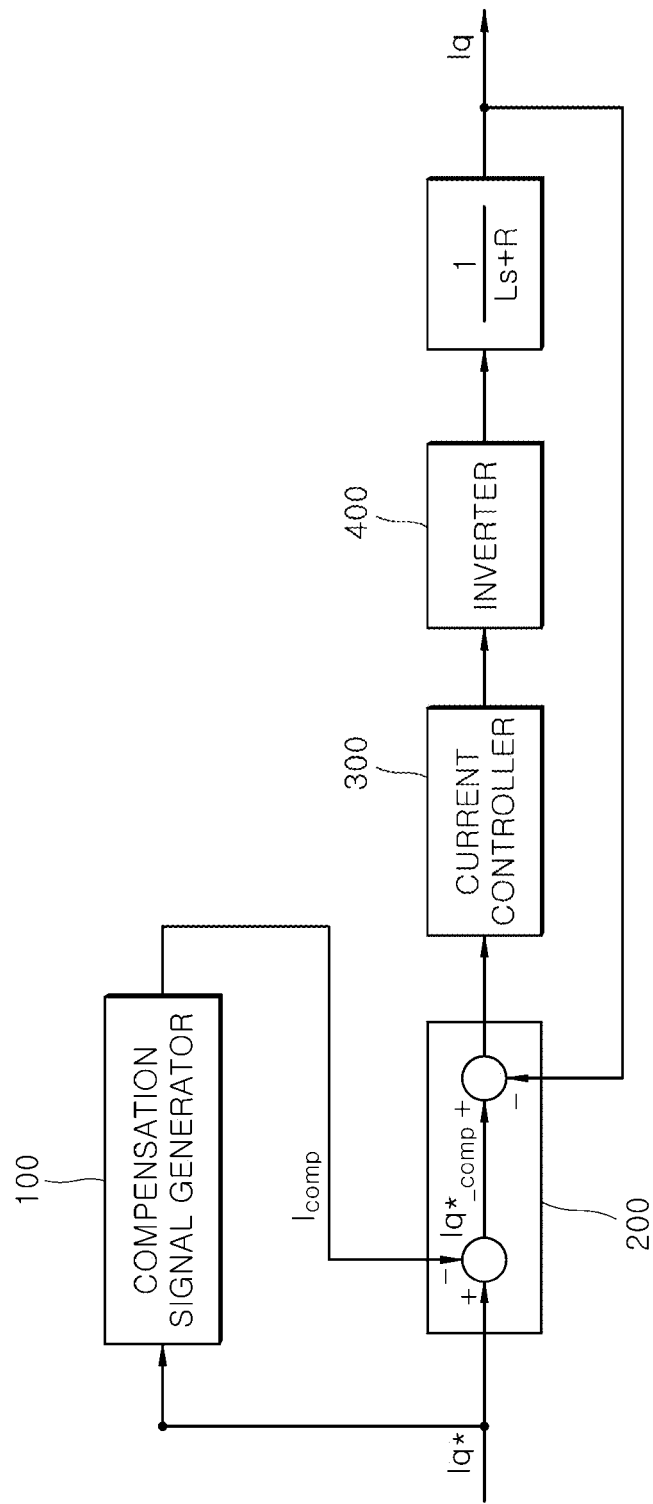
FIGS. 1 and 2 are block diagrams for explaining a motor control apparatus according to an embodiment of the present invention.
Figure 2:
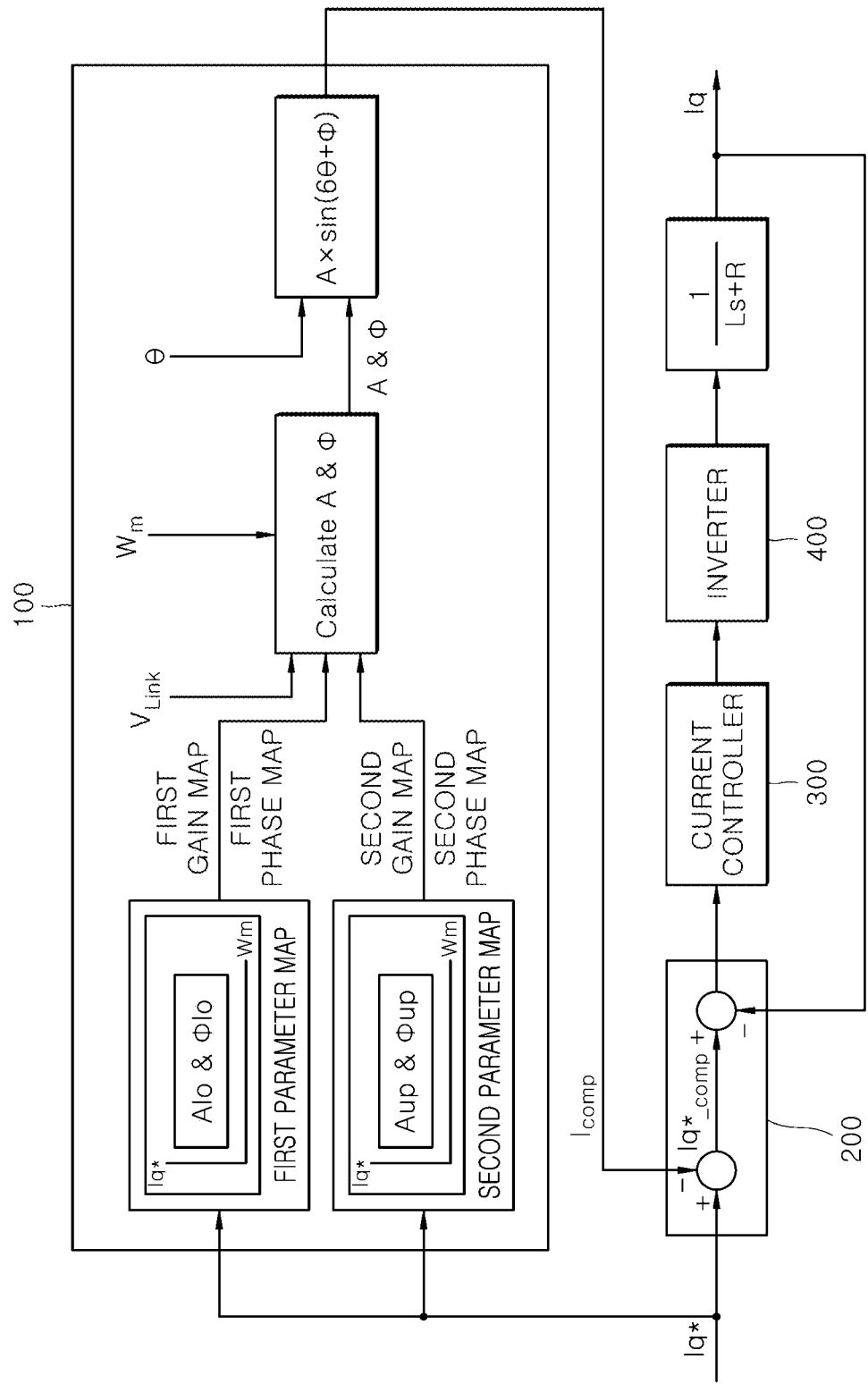
Figure 3:
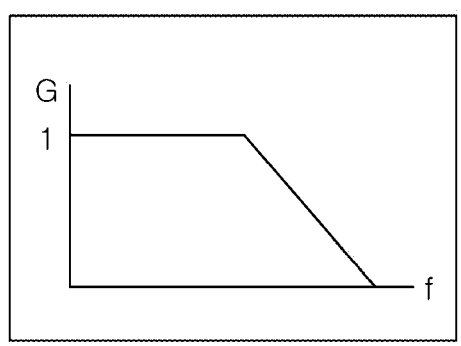
FIGS. 3 and 4 are exemplary views illustrating a gain reduction and phase delay phenomenon according to the frequency response characteristic of a current controller in the motor control apparatus according to the embodiment of the present invention.
Figure 3:
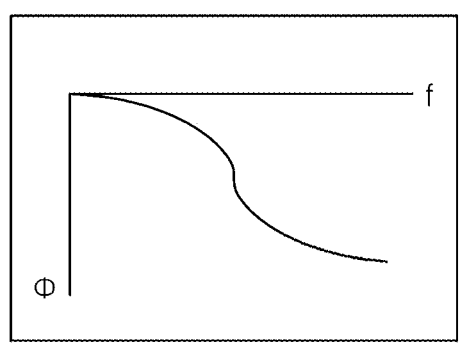
Figure 4:
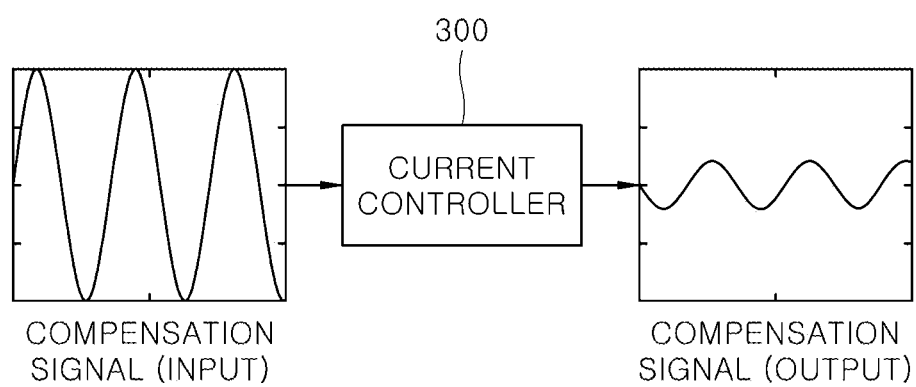
Figure 5:
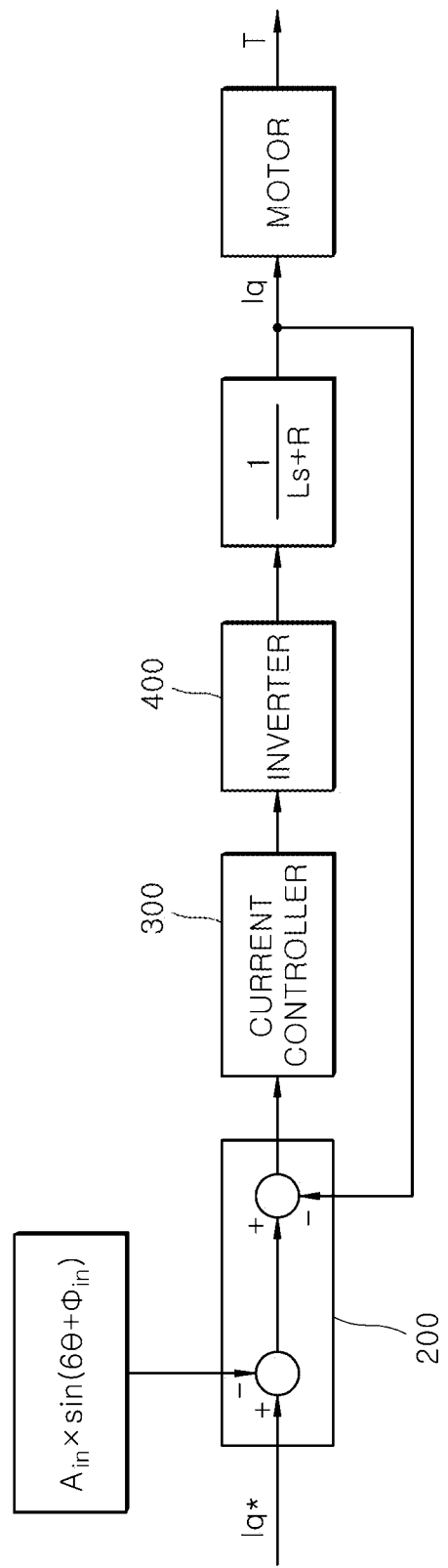
FIG. 5 is a block diagram illustrating a process of acquiring a parameter map in the motor control apparatus according to the embodiment of the present invention.
Figure 6:
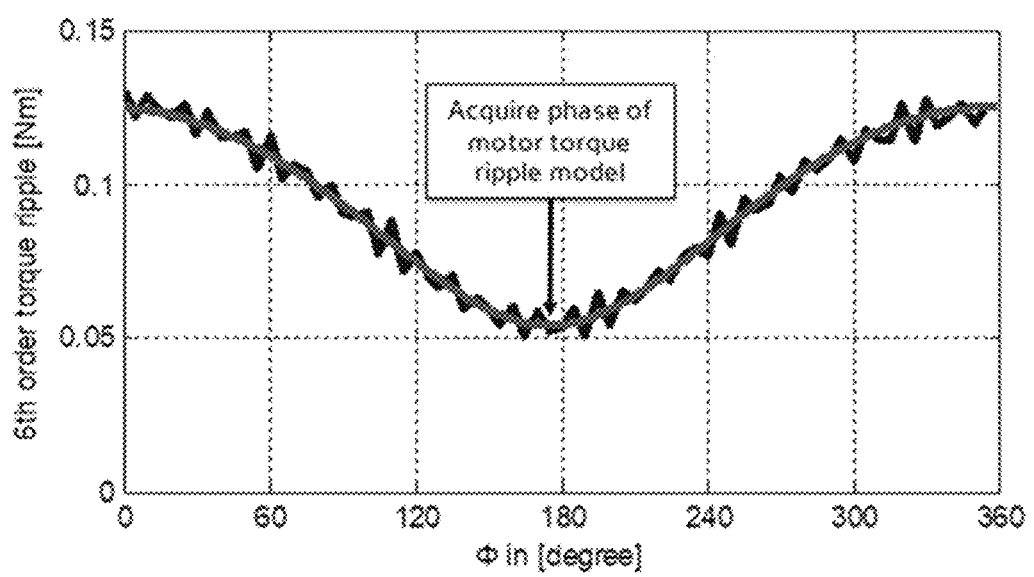
FIGS. 6 and 7 are exemplary views illustrating a process of acquiring a phase and gain of a motor torque ripple model when the parameter map is acquired in the motor control apparatus according to the embodiment of the present invention.
Figure 7:
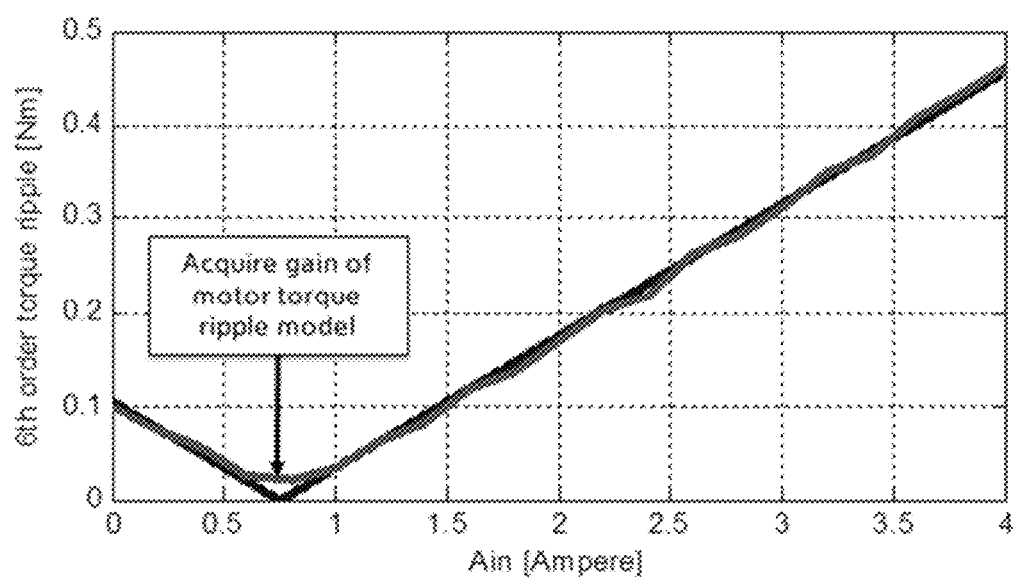
Figure 10:
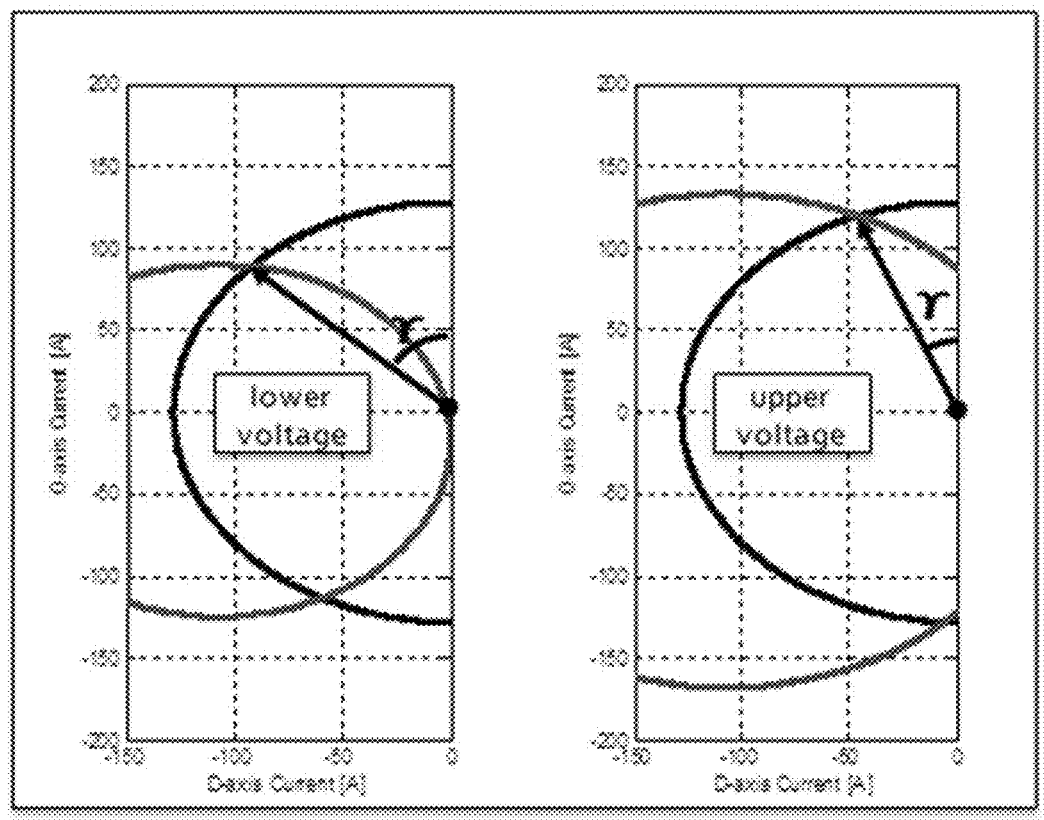
Figure 11:
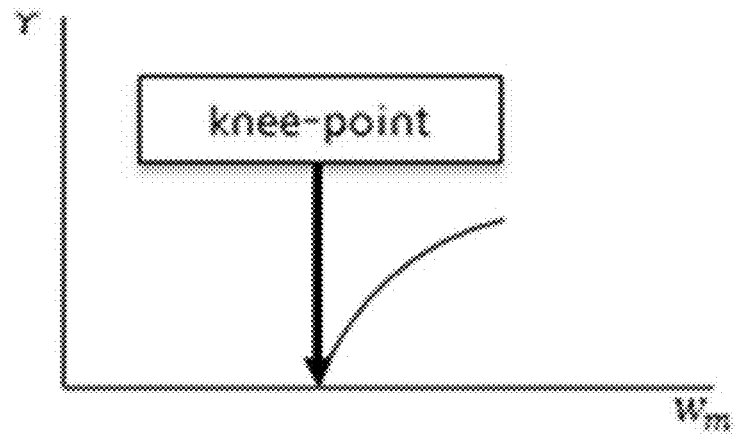
Figure 11:
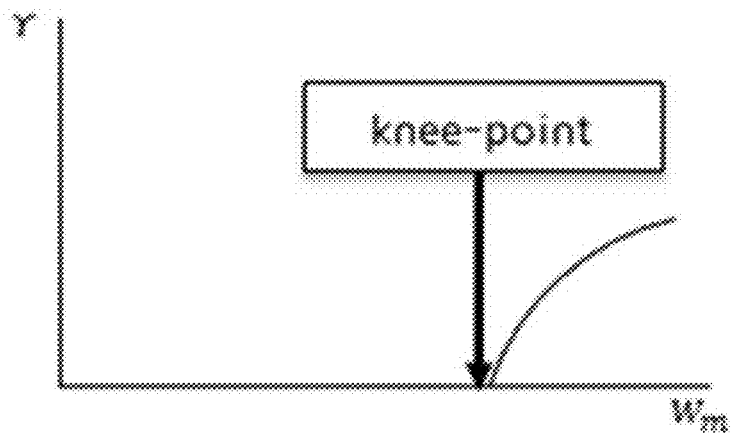
Figure 12:
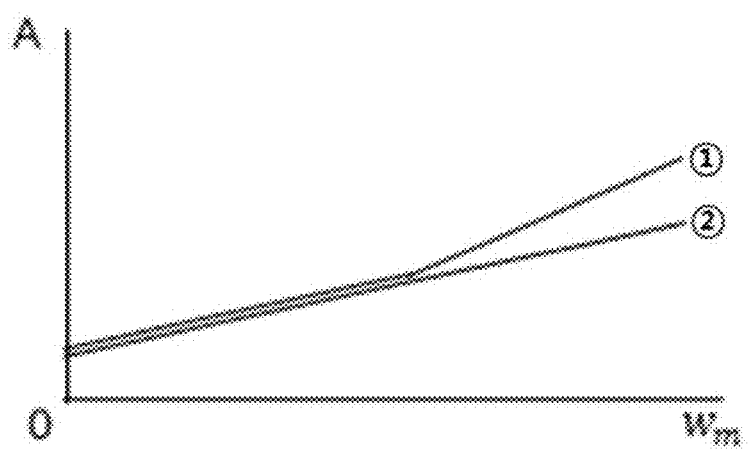
FIG. 12 is an exemplary view for explaining a process of determining a gain for generating a compensation signal in the motor control apparatus according to the embodiment of the present invention.

FIGS. 1 and 2 are block diagrams for explaining a motor control apparatus according to an embodiment of the present invention. FIGS. 3 and 4 are exemplary views illustrating a gain reduction and phase delay phenomenon according to the frequency response characteristic of a current controller in the motor control apparatus according to the embodiment of the present invention. FIG. 5 is a block diagram illustrating a process of acquiring a parameter map in the motor control apparatus according to the embodiment of the present invention. FIGS. 6 and 7 are exemplary views illustrating a process of acquiring a phase and gain of a motor torque ripple model when the parameter map is acquired in the motor control apparatus according to the embodiment of the present invention. FIGS. 8 to 11 are exemplary views for explaining flux weakening control performed in the motor control apparatus according to the embodiment of the present invention. FIG. 12 is an exemplary view for explaining a process of determining a gain for generating a compensation signal in the motor control apparatus according to the embodiment of the present invention. FIGS. 13 to 18 are exemplary views for explaining a process of determining a phase for generating a compensation signal in the motor control apparatus according to the embodiment of the present invention.

Referring to FIGS. 1 and 2, the motor control apparatus according to the embodiment of the present invention may include a compensation signal generator 100 and a current controller 300.

For the convenience of the description of the present embodiment, the motor of the disclosure will be exemplarily described below as being an MDPS motor, which is applied to an MDPS and is an auxiliary power source for assisting driver's steering, but the present invention is not limited thereto. The motor may include all types of motors that generate a predetermined order torque ripple due to the mechanical structure thereof during driving. Although the motor torque ripple of the disclosure will be described below as referring to a 6th order torque ripple based on an electric angle, the present invention is not limited thereto. A predetermined order torque ripple may correspond to the motor torque ripple of the present embodiment. It is to be noted that the terms are clearly distinguished by reference numerals indicated below.

The operation of the motor control apparatus according to the present embodiment will be generally described with reference to FIGS. 1 and 2. The compensation signal generator 100 may generate a compensation signal for compensating for a motor torque ripple generated when a motor is driven. An operator 200 may reflect (i.e., subtract) the generated compensation signal in (from) a motor command current, which is determined and input by the output value of a column torque sensor for detecting the torque of a steering column, may subtract a motor drive current fed back (i.e., a motor drive current supplied from an inverter 400 to the motor) from the subtracted result, and may input the subtracted result to the current controller 300. Accordingly, the current controller 300 controls the current of the motor by controlling the inverter 400 through proportional integral (PI) control such that the command current input from the operator 200 coincides with the motor drive current fed back. The inverter 400 may be connected to the motor to drive the motor based on the voltage supplied from the battery of the vehicle (i.e., DC-Link voltage), and to drive the motor (three-phase AC motor) by outputting an alternating current (three-phase alternating current) through a plurality of switches, each of which is turned on and off in response to the PWM control signal from the current controller 300.

Based on the above description, the operation of the motor control apparatus according to the present embodiment will be described in detail.

The compensation signal generator 100 may apply a DC-Link voltage $V_{Link}$ for driving the motor to a parameter map preset in order to estimate the gain and phase of the motor torque ripple generated when the motor is driven according to the motor command current and the motor rotation speed for driving the motor and may generate a compensation signal $i_{comp}$ for compensating for the motor torque ripple corresponding to the current input motor command current $i_q^*$, motor rotation speed $\omega_m$, and DC-Link voltage $V_{Link}$. That is, the compensation signal generator 100 in the present embodiment may generate a compensation signal $i_{comp}$ for compensating for the motor torque ripple in consideration of three factors of the motor command current $i_q^*$, the motor rotation speed $\omega_m$, and the DC-Link voltage $V_{Link}$.

Prior to describing the parameter map used by the compensation signal generator 100 to estimate the gain and phase of the motor torque ripple, the frequency response characteristic of the current controller 300 will be described.

As described above, the current controller 300 in the present embodiment may be implemented as a PI controller that controls the current of the motor by controlling the inverter 400 such that the compensation command current $i_q^*{}_{-comp}$, which is generated by reflecting the compensation signal $i_{comp}$ generated by the compensation signal generator 100 in the motor command current $i_q^*$, coincides with the motor drive current $i_q$ supplied to the motor from the inverter 400 operated based on the DC-Link voltage.

As illustrated in FIG. 3, the current controller 300 has a frequency response characteristic in which a gain is reduced and a phase is delayed in a high-frequency region, which means that when the reverse compensation of the motor command current is performed by generating the compensating signal without considering the frequency response characteristic of the current controller 300, the motor torque ripple generated in the high-speed rotation region of the motor may not be compensated for. That is, as illustrated in FIG. 4, when the compensation signal generated for compensating for the sixth order torque ripple of the motor is reflected in the motor command current without considering the frequency response characteristic of the current controller 300, the gain reduction and phase delay of the compensation signal occur according to the frequency response characteristic of the current controller 300 in the high-speed rotation region of the motor, thereby causing a problem in that the motor torque ripple may not be reduced.

In order to solve the above problem, the parameter map in the present embodiment may be preset in the compensation signal generator 100 in consideration of the frequency response characteristic of the current controller 300, so as to prevent the gain reduction and phase delay of the compensation signal $i_{comp}$ reflected in the compensation command current $i_q^*{}_{-comp}$ due to the frequency response characteristic of the current controller 300 in the high-speed rotation region of the motor. Here, the high-speed rotation region of the motor may be a rotation speed region of the motor corresponding to the region in which the speed of the steering column exceeds 0.5 [rps].

Specifically, the parameter map may be acquired by, for each motor rotation speed, repeatedly performing a process of constantly maintaining the motor rotation speed and the motor command current input to the current controller 300, a process of acquiring the phase of the motor torque ripple model when the magnitude of the motor torque ripple, which is measured when the motor torque ripple is modeled to vary the phase of the motor torque ripple model reflected in the motor command current, is minimum, and a process of acquiring the gain of the motor torque ripple model when the magnitude of the motor torque ripple, which is measured when the gain of the motor torque ripple model is varied while the phase of the motor torque ripple model is kept constant with the acquired phase, is minimum. FIG. 5 is a block diagram illustrating the process of acquiring the parameter map. In FIG. 5, $A_{in} \times \sin(6\theta + \varphi_{in})$ refers to a motor torque ripple model.

In more detail, first, the motor rotation speed and the motor command current are kept constant to acquire the parameter map.

The motor torque ripple model is reflected in the motor command current (i.e., the motor torque ripple model is subtracted from the motor command current) so that the current of the motor is controlled by the current controller 300. In this case, the magnitude of the motor torque ripple is measured while varying the phase of the motor torque ripple model from 0° to 360° (separate equipment may be utilized to measure the magnitude of the motor torque ripple). Since the phase of the motor torque ripple model when the measured magnitude of the motor torque ripple is minimum may be estimated as the phase of the motor torque ripple according to the following Equation 1 and FIG. 6, the phase of the motor torque ripple model when the measured magnitude of the motor torque ripple is minimum is acquired and stored.

$$\tau = A_\tau \sin(6\theta + \emptyset) - A\sin(6\theta + \emptyset_{in}) \quad \text{[Equation 1]}$$
$$\tau = (A_\tau \cos\emptyset - A\cos\emptyset_{in})\sin6\theta + (A_\tau \sin\emptyset - A\sin\emptyset_{in})\cos6\theta$$
$$|\tau| = \sqrt{(A_\tau \cos\emptyset - A\cos\emptyset_{in})^2} + \sqrt{(A_\tau \sin\emptyset - A\sin\emptyset_{in})^2}$$
$$|\tau| = \sqrt{A_\tau^2 + A^2 - 2A_\tau A\cos(\emptyset - \emptyset_{in})}$$

where $A_\tau \times \sin(6\theta+\varphi)$ refers to the motor torque ripple generated in the process of estimating the phase of the motor torque ripple, and $\tau$ refers to the measured motor torque ripple.

Next, the current of the motor is controlled by the current controller 300 while the acquired phase of the motor torque ripple model is kept constant. In this case, the magnitude of the motor torque ripple is measured while the gain of the motor torque ripple model is varied. Since the gain of the motor torque ripple model when the measured magnitude of the motor torque ripple is minimum may be estimated as the gain of the motor torque ripple according to the following Equation 2 and FIG. 7, the gain of the motor torque ripple model when the measured magnitude of the motor torque ripple is minimum is acquired and stored.

$$\tau = A_\tau \sin(6\theta + \emptyset) - A_{in}\sin(6\theta + \emptyset) \quad \text{[Equation 2]}$$
$$\tau = (A_\tau - A_{in})\cos\emptyset\sin6\theta + (A_\tau - A_{in})\sin\emptyset\cos6\theta$$
$$|\tau| = \sqrt{(A_\tau - A_{in})^2(\cos^2\emptyset + \sin^2\emptyset)}$$
$$|\tau| = |A_\tau - A_{in}|$$

where $A_\tau \times \sin(6\theta+\varphi)$ refers to the motor torque ripple generated in the process of estimating the gain of the motor torque is ripple, and $\tau$ refers to the measured motor torque ripple.

The process of estimating the gain and phase of the motor torque ripple according to Equations 1 and 2 may be repeatedly performed for each motor rotation speed, and the motor rotation speed to estimate the gain and phase of the motor torque ripple may be selected variously according to the designer's intention. When the estimation of the gain and phase of the motor torque ripple according to Equations 1 and 2 are completed for each motor rotation speed selected by the designer, it is possible to secure the parameter map for estimating the gain and phase of the motor torque ripple according to the motor command current and the motor rotation speed.

Through the above process, by acquiring the phase and gain of the motor torque ripple model when the magnitude of the motor torque ripple, which is measured in the process of performing the current control by the current controller 300 for each motor rotation speed, is minimum to create the parameter map, and then, by estimating the gain and phase of the motor torque ripple based on the created parameter map, it is possible to secure motor control performance that is not affected by the frequency response characteristic of the current controller 300.

Meanwhile, the parameter map acquired through the above process may include a first parameter map for estimating the gain and phase of the motor torque ripple at the lower limit of the DC-Link voltage for normally driving the motor, and a second parameter map for estimating the gain and phase of the motor torque ripple at the upper limit of the DC-Link voltage for normally driving the motor.

That is, the first parameter map may be acquired by completing the estimation of the gain and phase of the motor torque ripple according to Equations 1 and 2 for each motor rotation speed in the state in which the DC-Link voltage is maintained at the lower limit. The second parameter map may be acquired by completing the estimation of the gain and phase of the motor torque ripple according to Equations 1 and 2 for each motor rotation speed in the state in which the DC-Link voltage is maintained at the upper limit. Dividing the parameter map into the first and second parameter maps based on the DC-Link voltage is to generate a compensation signal in consideration of the fact that a knee-point changes depending on the DC-Link voltage as will be described below. The lower limit and upper limit of the DC-Link voltage refer to a lower limit and upper limit of the voltage to be input to the motor for normal driving. The lower limit and upper limit of the DC-Link voltage may be, for example, 10V and 14V, respectively, but the present invention is not limited thereto.

The above process of acquiring the parameter map may be controlled and performed at an MDPS ECU level.

Meanwhile, as described above, the compensation signal generator 100 in the present embodiment may generate a compensation signal in further consideration of the DC-Link voltage $V_{Link}$ together with the motor rotation speed $\omega_m$ and the motor command current $i_q^*$.

For a detailed description thereof, the flux weakening control of the motor will be generally described with reference to FIGS. 8 to 11. Typically, the counter electromotive force generated when the three-phase AC motor is driven increases in proportion to the magnetic flux and the motor rotation speed. When the control voltage of the motor is insufficient due to the increase in the counter electromotive force as the magnetic flux or the motor rotation speed increases (that is, when the motor control voltage determined by summing up the counter electromotive force at the DC-Link voltage is insufficient), the control of the motor is limited in the high-speed rotation region of the motor. Therefore, by controlling a d-axis command current for the rotor to reduce the magnetic flux of the rotor and reduce the counter electromotive force, the control performance of the motor is secured in the high-speed rotation region of the motor. The point of time when the control voltage of the motor is insufficient or the point of time when the flux weakening control of the motor is started is collectively referred to as a knee-point. In the present embodiment, the knee-point is defined as a motor rotation speed at which the flux weakening control of the motor is started for clarity of definition.

Figure 8:
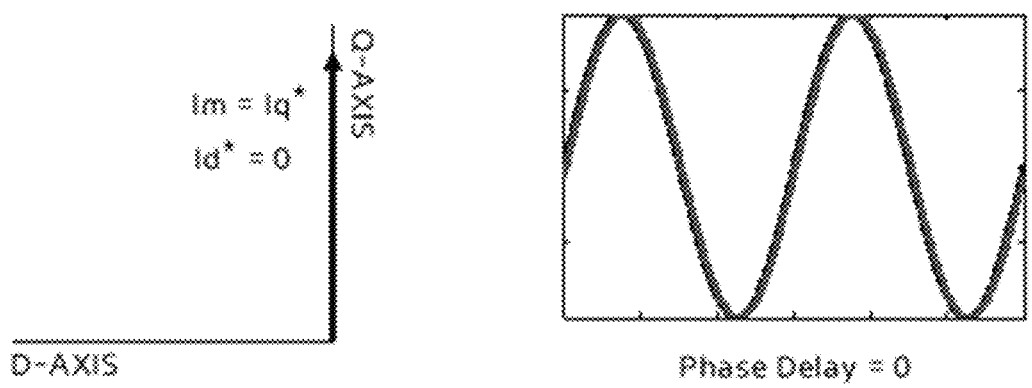
FIGS. 8 to 11 are exemplary views for explaining flux weakening control performed in the motor control apparatus according to the embodiment of the present invention.
Figure 9:
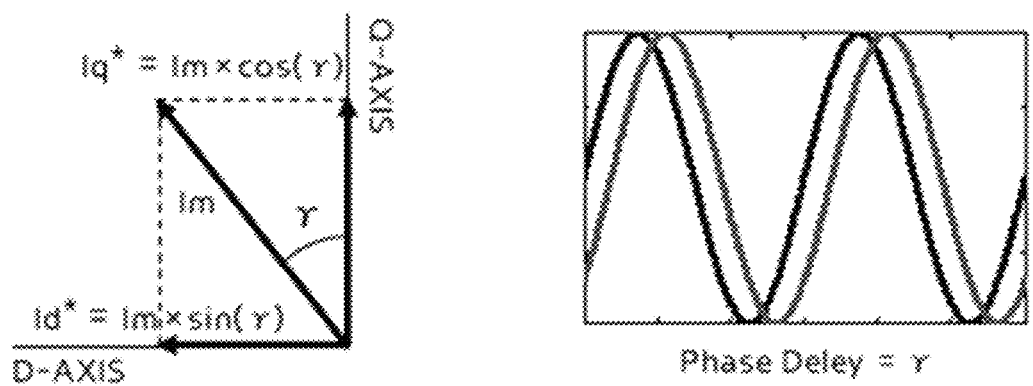

As illustrated in FIG. 8, when the motor rotation speed is less than the knee-point, the phase of the torque generated in the motor is not delayed because the value of the d-axis command current is 0. On the other hand, as illustrated in FIG. 9, when the motor rotation speed is higher than the knee-point, the phase of the torque generated in the motor to which the d-axis command current is applied according to the flux weakening control is delayed by t that is a field weakening phase angle. The phase delay occurring during the flux weakening control increases as the magnitude of the DC-Link voltage decreases, as illustrated in FIG. 10. The phase delay occurring during the flux weakening control is already reflected in the parameter map acquired through the above-mentioned process. However, the point of time when the flux weakening control is started is changed depending on the magnitude of the DC-Link voltage, which means that the knee-point is changed depending on the magnitude of the DC-Link voltage as illustrated in FIG. 11. Therefore, it is necessary to generate the compensation signal in consideration of the DC-Link voltage. Hereinafter, the process of generating the compensation signal in consideration of the DC-Link voltage will be described in detail.

First, a process of determining a gain A for generating the compensation signal $i_{comp}$ will be described with reference to FIG. 12. The compensation signal generator 100 may determine the gain A for generating the compensation signal $i_{comp}$ by extracting a first gain map $\hat{1}$ according to the motor rotation speed from the first parameter map, extracting a second gain map $\hat{2}$ according to the motor rotation speed from the second parameter map, and interpolating the first and second gain maps $\hat{1}$ and $\hat{2}$ through the DC-Link voltage $V_{Link}$.

Specifically, when the DC-Link voltage $V_{Link}$ is between the lower limit and the upper limit described above, the compensation signal generator 100 may determine the gain A for generating the compensation signal $i_{comp}$ at the DC-Link voltage $V_{Link}$ by interpolating the first gain map $\hat{1}$ through the DC-Link voltage $V_{Link}$ to determine a gain $A_{lo}$, interpolating the second gain map $\hat{2}$ through the DC-Link voltage $V_{Link}$ to determine a gain $A_{up}$, and then interpolating the two gains $A_{lo}$ and $A_{up}$.

On the other hand, when the DC-Link voltage $V_{Link}$ is less than or equal to the lower limit, the compensation signal generator 100 may determine the gain A for generating the compensation signal $i_{comp}$ by interpolating the first gain map $\hat{1}$ through the DC-Link voltage $V_{Link}$. When the DC-Link voltage $V_{Link}$ is equal to or greater than the upper limit, the compensation signal generator 100 may determine the gain A for generating the compensation signal $i_{comp}$ by interpolating the second gain map $\hat{2}$ through the DC-Link voltage $V_{Link}$. In this case, the compensation signal generator 100 may interpolate the first and second gain maps $\hat{1}$ and $\hat{2}$ by linear interpolation or the like.

Next, a process of determining a phase $\varphi$ for generating the compensation signal $i_{comp}$ will be described with reference to FIG. 13. As described above, the compensation signal generator 100 may determine the phase $\varphi$ for generating the compensation signal $i_{comp}$ by interpolating the first and second parameter maps through the DC-Link voltage $V_{Link}$ in order to consider the change in the knee-point depending on the change in the DC-Link voltage.

Specifically, the compensation signal generator 100 may determine the phase $\varphi$ for generating the compensation signal $i_{comp}$ by extracting a first phase map $\hat{1}$ according to the motor rotation speed from the first parameter map, extracting a second phase map $\hat{2}$ according to the motor rotation speed from the second parameter map, and then interpolating the first and second phase maps $\hat{1}$ and $\hat{2}$ through the DC-Link voltage $V_{Link}$.

Figure 13:
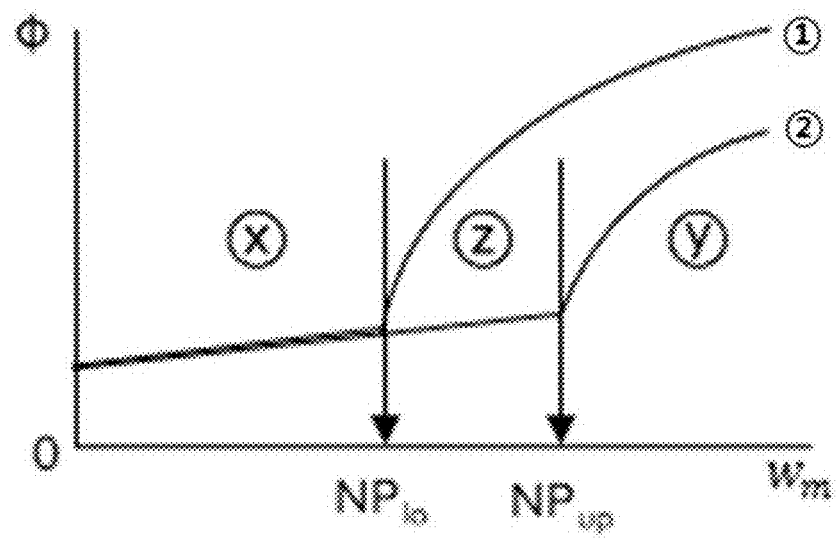
FIGS. 13 to 18 are exemplary views for explaining a process of determining a phase for generating a compensation signal in the motor control apparatus according to the embodiment of the present invention.

Referring to FIG. 13, the region where the phase $\varphi$ is determined may be divided into, according to the motor rotation speed, a region less than the knee-point $NP_{lo}$ of the first phase map $\hat{1}$ (hereinafter, referred to as an "$\hat{x}$ region"), a region between the knee-point $NP_{lo}$ of the first phase map $\hat{1}$ and the knee-point $NP_{up}$ of the second phase map $\hat{2}$ (hereinafter, referred to as a "$\hat{z}$ region"), and a region greater than the knee-point $NP_{up}$ of the second phase map $\hat{2}$ (hereinafter, referred to as a "$\hat{y}$ region").

In the $\hat{x}$ region and the $\hat{y}$ region, when the DC-Link voltage $V_{Link}$ is between the lower limit and the upper limit described above, the compensation signal generator 100 may determine the phase $\varphi$ for generating the compensation signal $i_{comp}$ at the DC-Link voltage $V_{Link}$ by interpolating the first phase map $\hat{1}$ through the DC-Link voltage $V_{Link}$ to determine a phase $\varphi_{lo}$, interpolating the second phase map $\hat{2}$ through the DC-Link voltage $V_{Link}$ to determine a phase $\varphi_{up}$ and then interpolating the two phases $\varphi_{lo}$ and $\varphi_{up}$. On the other hand, when the DC-Link voltage $V_{Link}$ is less than or equal to the lower limit, the compensation signal generator 100 may determine the phase $\varphi$ for generating the compensation signal $i_{comp}$ by interpolating the first phase map $\hat{1}$ through the DC-Link voltage $V_{Link}$. When the DC-Link voltage $V_{Link}$ is equal to or greater than the upper limit, the compensation signal generator 100 may determine the phase $\varphi$ for generating the compensation signal $i_{comp}$ by interpolating the second phase map $\hat{2}$ through the DC-Link voltage $V_{Link}$. In this case, the compensation signal generator 100 may interpolate the first and second phase maps $\hat{1}$ and $\hat{2}$ by linear interpolation or the like.

Figure 14:
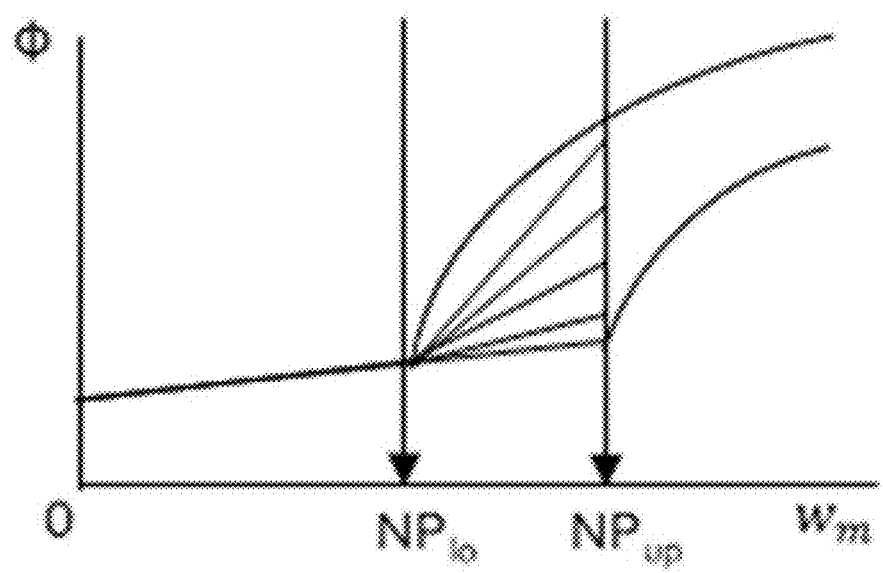
Figure 15:
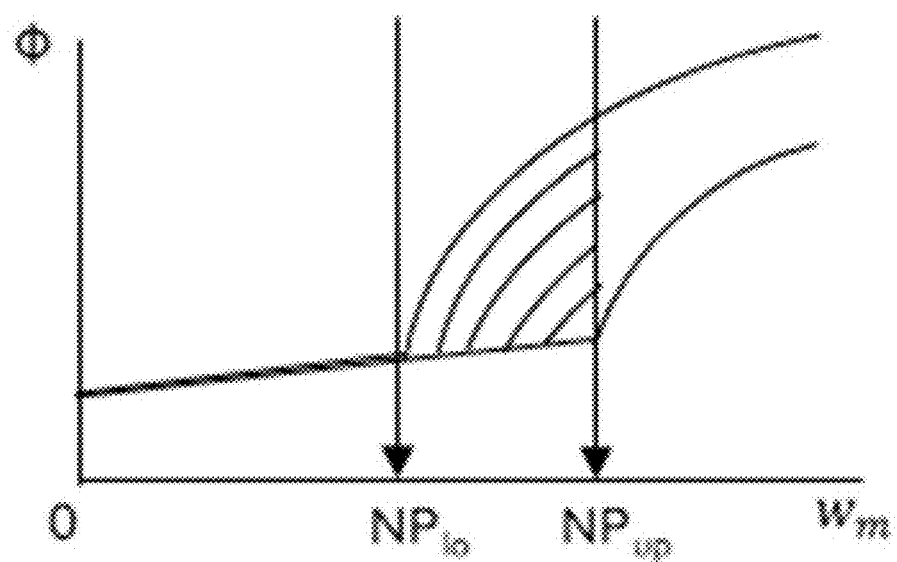

In the $\hat{z}$ region, when the DC-Link voltage $V_{Link}$ is between the lower limit and the upper limit described above, the above-mentioned linear interpolation may not be applied thereto. That is, in order to generate the compensation signal in consideration of the change in the knee-point depending on the change in the DC-Link voltage, the interpolation illustrated in FIG. 15 is required, but the interpolation result illustrated in FIG. 14 is derived according to the linear interpolation. Hence, it is impossible to generate the compensation signal in which the change in the knee-point depending on the change in the DC-Link voltage is accurately reflected.

Figure 16:
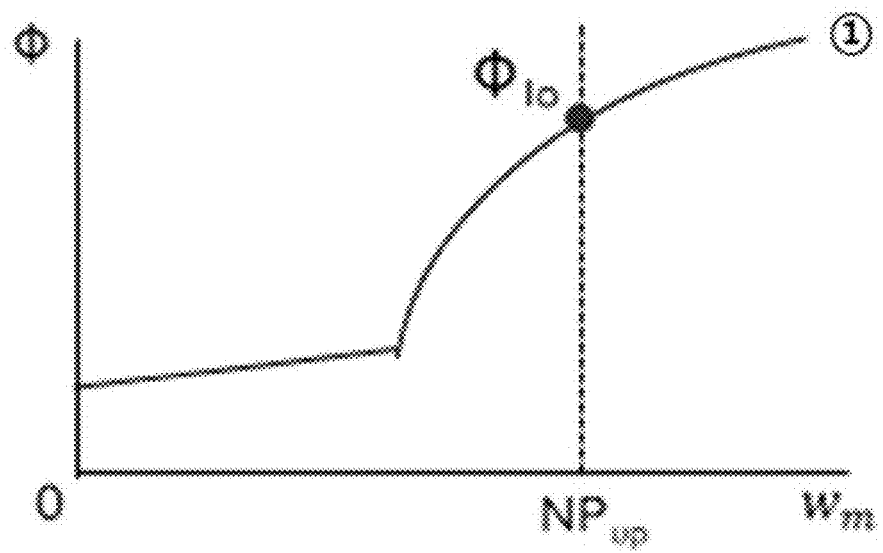
Figure 16:
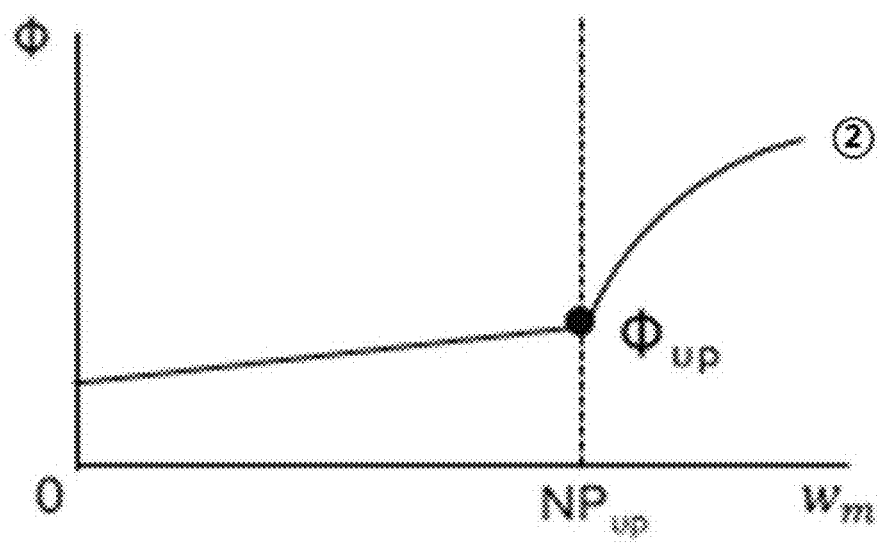
Figure 17:
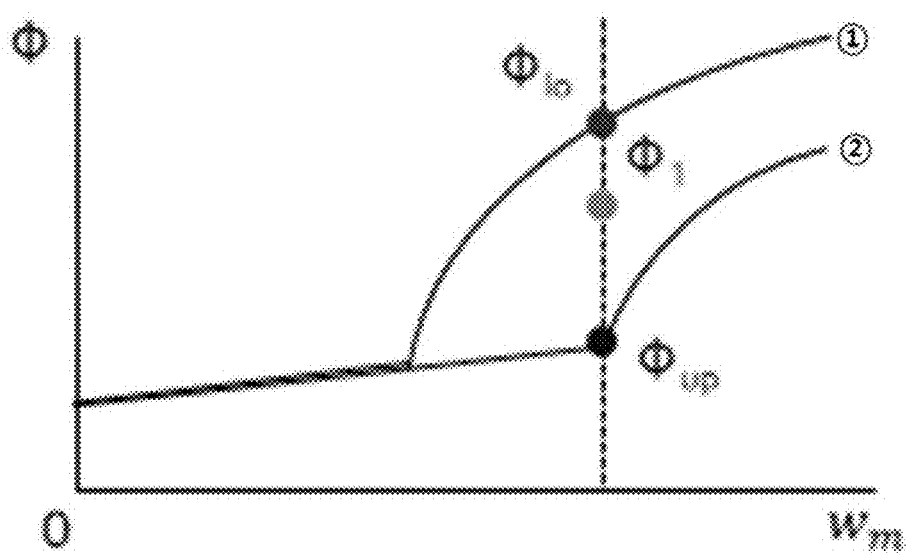

In order to solve this problem, in the present embodiment, when the DC-Link voltage $V_{Link}$ is between the lower limit and the upper limit when the motor rotation speed $\omega_m$ is in a range between the knee-point $NP_{lo}$ of the first phase map $\hat{1}$ and the knee-point $NP_{up}$ of the second phase map $\hat{2}$, the compensation signal generator 100 first determines a phase value $\varphi_1$ corresponding to the DC-Link voltage $V_{Link}$ at the knee-point $NP_{up}$ by linearly interpolating a phase value $\varphi_{lo}$ at the knee-point $NP_{lo}$ of the first phase map $\hat{1}$ and a phase value $\varphi_{up}$ at the knee-point $NP_{up}$ of the second phase map $\hat{2}$ through the DC-Link voltage $V_{Link}$, as illustrated in FIGS. 16 and 17. For example, when the lower limit is 10V, the upper limit is 14V, and the DC-Link voltage is 12V, the phase value $\varphi_1$ is a phase value corresponding to the midpoint of the line segment connecting $\varphi_{lo}$ and $\varphi_{up}$ in FIG. 17.

Figure 18:
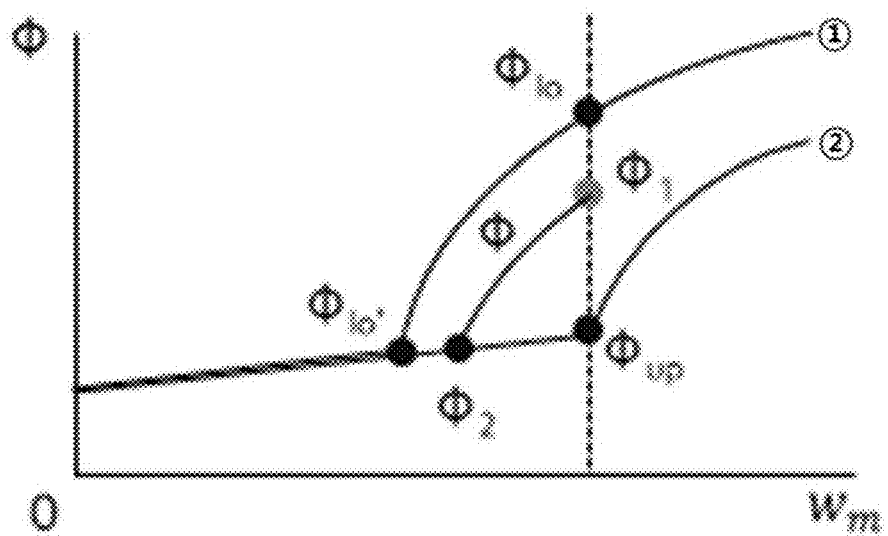

Then, the compensation signal generator 100 determines a phase value $\varphi_2$ at the point determined by linearly interpolating a phase value $\varphi_{lo}'$ at the knee-point $NP_{lo}$ of the first phase map $\hat{1}$ and a phase value $\varphi_{up}$ at the knee-point $NP_{up}$ of the second phase map $\hat{2}$ through the DC-Link voltage $V_{Link}$, as illustrated in FIG. 18. For example, when the lower limit is 10V, the upper limit is 14V, and the DC-Link voltage is 12V, the phase value $\varphi_2$ is a phase value corresponding to the midpoint of the line segment connecting $\varphi_{lo}'$ and $\varphi_{up}$.

Then, the compensation signal generator 100 determines the phase $\varphi$ for generating the compensation signal $i_{comp}$ by interpolating the determined phase values $\varphi_1$ and $\varphi_2$. The phase values $\varphi_1$ and $\varphi_2$ may be interpolated using various types of interpolation such as linear interpolation, Lagrange interpolation, or Newton interpolation.

Through the above interpolation process, the interpolation result illustrated in FIG. 15 is derived so that the compensation signal may be generated in consideration of the change in the knee-point depending on the change in the DC-Link voltage.

Meanwhile, in the $\hat{z}$ region, when the DC-Link voltage $V_{Link}$ is less than or equal to the lower limit, the compensation signal generator 100 may determine the phase $\varphi$ for generating the compensation signal $i_{comp}$ by interpolating the first phase map $\hat{1}$ through the DC-Link voltage $V_{Link}$. When the DC-Link voltage $V_{Link}$ is equal to or greater than the upper limit, the compensation signal generator 100 may determine the phase φ for generating the compensation signal $i_{comp}$ by interpolating the second phase map $\hat{2}$ through the DC-Link voltage $V_{Link}$. In this case, the compensation signal generator 100 may interpolate the first and second phase maps $\hat{1}$ and $\hat{2}$ by linear interpolation or the like.

When the gain A and phase φ of the compensation signal are determined through the above process, the compensation signal generator 100 receives the rotation angle of the motor and finally generates a compensation signal $i_{comp}$ for compensating for the motor torque ripple.

When the current of the motor is controlled by the reverse compensation of the motor command current $i_q^*$ through the compensation signal $i_{comp}$ generated through the above process, it is possible to reduce the sixth order torque ripple and noise of the motor and thus to improve the noise, vibration, and harshness (NVH) performance of the MDPS.

Figure 19:
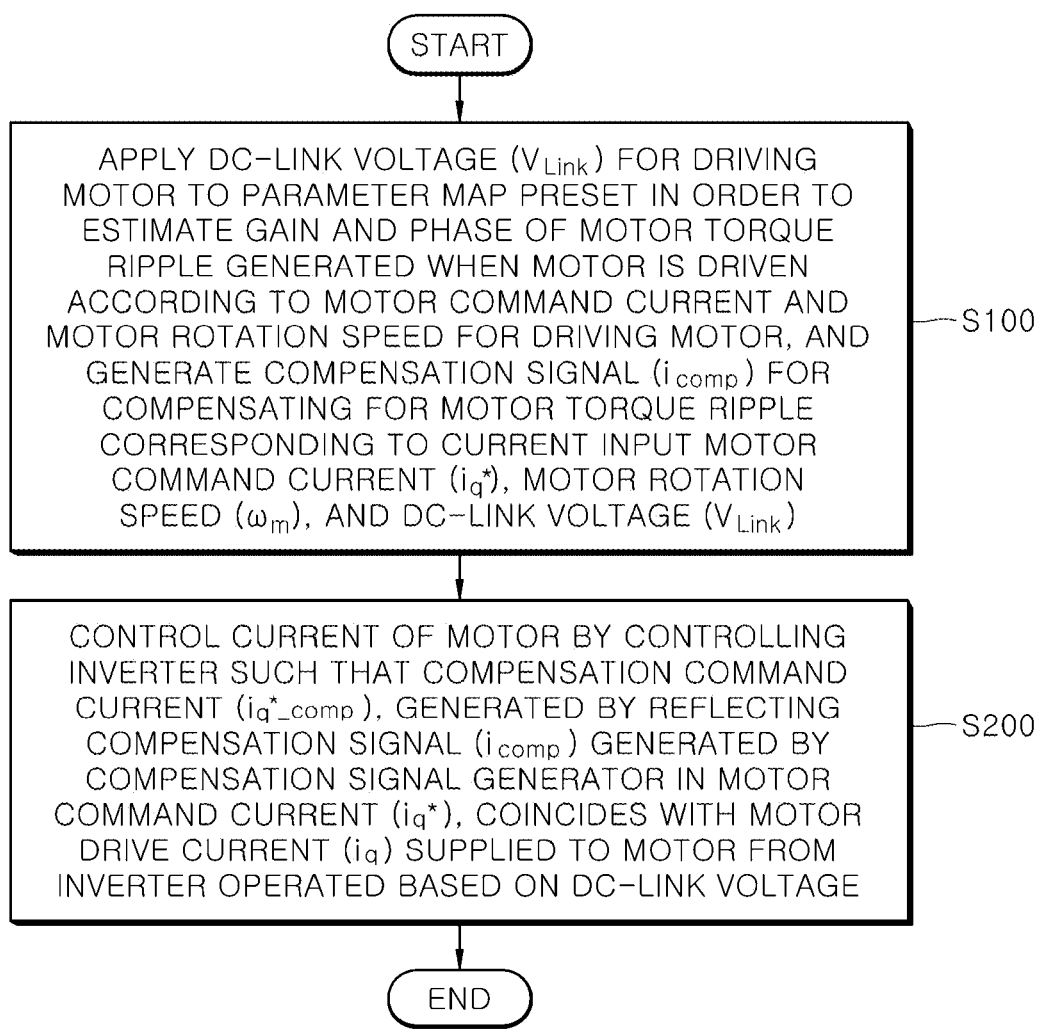
FIGS. 19 and 20 are flowcharts for explaining a motor control method according to an embodiment of the present invention.
Figure 20:
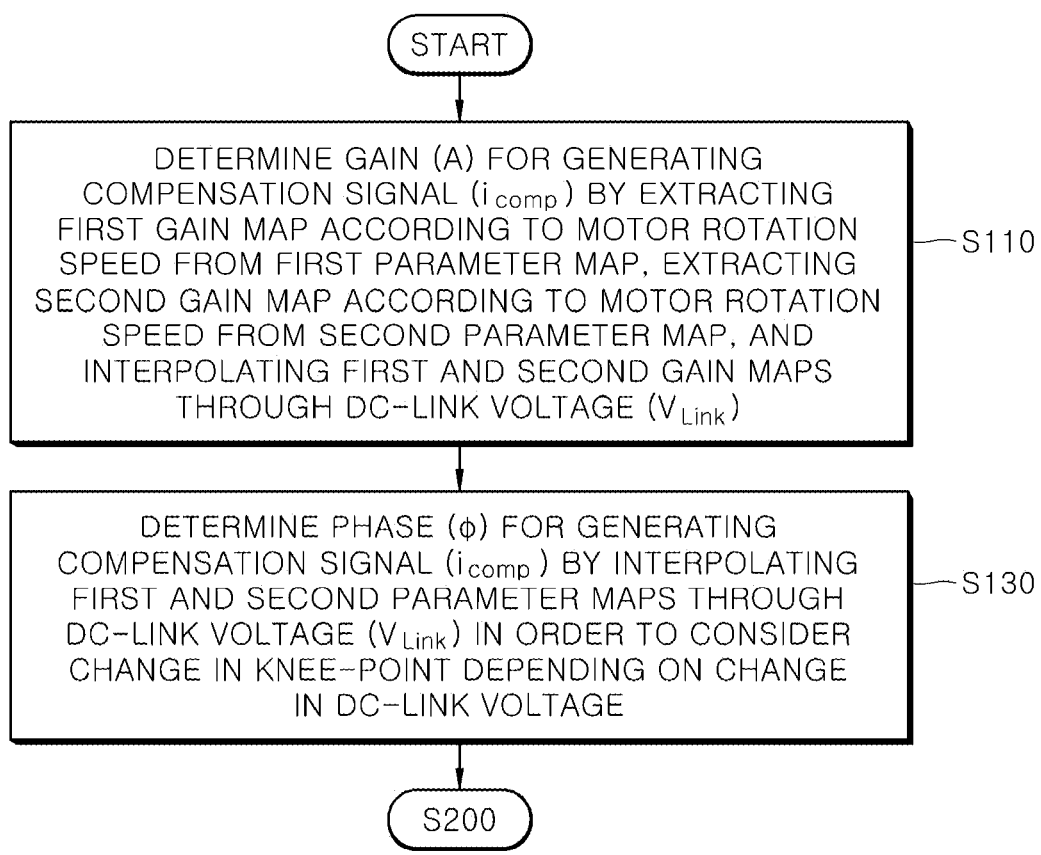

FIGS. 19 and 20 are flowcharts for explaining a motor control method according to an embodiment of the present invention.

The motor control method according to the embodiment of the present invention will be described with reference to FIG. 19. First, a compensation signal generator 100 applies a DC-Link voltage $V_{Link}$ for driving a motor to a parameter map preset in order to estimate a gain and phase of a motor torque ripple generated when the motor is driven according to a motor command current and a motor rotation speed for driving the motor, and generates a compensation signal $i_{comp}$ for compensating for the motor torque ripple corresponding to the current input motor command current $i_q^*$, motor rotation speed $\omega_m$, and DC-Link voltage $V_{Link}$ (S100).

Next, a current controller 300 controls the current of the motor by controlling an inverter 400 such that a compensation command current $i_q^*{}_{-comp}$, which is generated by reflecting the compensation signal $i_{comp}$ generated by the compensation signal generator 100 in the motor command current $i_q^*$, coincides with a motor drive current $i_q$ supplied to the motor from the inverter 400 operated based on the DC-Link voltage (S200).

The parameter map utilized in step S100 may be preset in consideration of the frequency response characteristic of the current controller 300, so as to prevent the gain reduction and phase delay of the compensation signal $i_{comp}$ reflected in the compensation command current $i_q^*{}_{-comp}$ due to the frequency response characteristic of the current controller 300 in the high-speed rotation region of the motor.

The parameter map may be acquired by, for each motor rotation speed, repeatedly performing a process of constantly maintaining the motor rotation speed and the motor command current input to the current controller 300, a process of acquiring the phase of the motor torque ripple model when the magnitude of the motor torque ripple, which is measured when the motor torque ripple is modeled to vary the phase of the motor torque ripple model reflected in the motor command current, is minimum, and a process of acquiring the gain of the motor torque ripple model when the magnitude of the motor torque ripple, which is measured when the gain of the motor torque ripple model is varied while the phase of the motor torque ripple model is kept constant with the acquired phase, is minimum.

In addition, the parameter map may include a first parameter map for estimating the gain and phase of the motor torque ripple at the lower limit of the DC-Link voltage for normally driving the motor, and a second parameter map for estimating the gain and phase of the motor torque ripple at the upper limit of the DC-Link voltage for normally driving the motor.

Meanwhile, as illustrated in FIG. 20, the step S100 may include a step S110 of determining, by the compensation signal generator 100, a gain A for generating the compensation signal $i_{comp}$ by extracting a first gain map $\hat{1}$ according to the motor rotation speed from the first parameter map, extracting a second gain map $\hat{2}$ according to the motor rotation speed from the second parameter map, and then interpolating the first and second gain maps $\hat{1}$ and $\hat{2}$ through the DC-Link voltage $V_{Link}$, and a step S130 of determining, by the compensation signal generator 100, a phase φ for generating the compensation signal $i_{comp}$ by interpolating the first and second parameter maps through the DC-Link voltage $V_{Link}$ in order to consider the change in a knee-point depending on the change in the DC-Link voltage. The knee-point is defined as a motor rotation speed at which the flux weakening control of the motor is started as described above.

In this case, in step S130, the compensation signal generator 100 may determine the phase φ for generating the compensation signal $i_{comp}$ by extracting a first phase map $\hat{1}$ according to the motor rotation speed from the first parameter map, extracting a second phase map $\hat{2}$ according to the motor rotation speed from the second parameter map, and then interpolating the first and second phase maps $\hat{1}$ and $\hat{2}$ through the DC-Link voltage $V_{Link}$.

Specifically, when the DC-Link voltage $V_{Link}$ is between the lower limit and the upper limit when the motor rotation speed $\omega_m$ is in a range between the knee-point $NP_{lo}$ of the first phase map $\hat{1}$ and the knee-point $NP_{up}$ of the second phase map $\hat{2}$, the compensation signal generator 100 may determine the phase φ for generating the compensation signal $i_{comp}$ by determining a phase value $\varphi_1$ corresponding to the DC-Link voltage $V_{Link}$ at the knee-point $NP_{up}$ by linearly interpolating a phase value $\varphi_{lo}$ at the knee-point $NP_{lo}$ of the first phase map $\hat{1}$ and a phase value $\varphi_{up}$ at the knee-point $NP_{up}$ of the second phase map $\hat{2}$ through the DC-Link voltage $V_{Link}$, by determining a phase value $\varphi_2$ at the point determined by linearly interpolating a phase value $\varphi_{lo}'$ at the knee-point $NP_{lo}$ of the first phase map $\hat{1}$ and a phase value $\varphi_{up}$ at the knee-point $NP_{up}$ of the second phase map $\hat{2}$ through the DC-Link voltage $V_{Link}$, and then by is interpolating the determined phase values $\varphi_1$ and $\varphi_2$.

When the gain A and phase φ of the compensation signal are determined through the above process, the compensation signal generator 100 receives the rotation angle of the motor and finally generates a compensation signal $i_{comp}$ for compensating for the motor torque ripple.

When the current of the motor is controlled by the reverse compensation of the motor command current $i_q^*$ through the compensation signal $i_{comp}$ generated through the above process, it is possible to reduce the sixth order torque ripple and noise of the motor and thus to improve the noise, vibration, and harshness (NVH) performance of the MDPS.

As described above, in the present embodiment, by generating the compensation signal for compensating for the motor torque ripple based on the parameter map set in consideration of the frequency response characteristic of the current controller for controlling the MDPS motor to reversely compensate for the motor command current, it is possible to secure motor control performance that is not affected by the frequency response characteristic of the current controller by preventing the gain reduction and phase delay of the compensation signal from occurring in the high-speed rotation region of the motor.

In addition, in the present embodiment, in order to compensate for the phenomenon in which phase delay characteristics are changed due to the change in the knee-point at which the flux weakening control is started according to the DC-Link voltage required for driving the motor, a configuration is adopted in which the compensation signal is generated by interpolating the parameter map according to the DC-Link voltage. Therefore, it is possible to improve phase accuracy during the control of the motor.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the invention should be defined by the appended claims.

What is claimed is:

1. A motor control apparatus comprising:
a compensation signal generator configured to:
apply a DC-Link voltage ($V_{Link}$) for driving a motor to a parameter map preset in order to estimate a gain and phase of a motor torque ripple generated when the motor is driven according to a motor command current and a motor rotation speed for driving the motor, wherein the parameter map is preset to include a first parameter map corresponding to a lower limit of the DC-Link voltage for normally driving the motor and a second parameter map corresponding to an upper limit of the DC-Link voltage for normally driving the motor, and
generate a compensation signal ($i_{comp}$) for compensating for the motor torque ripple corresponding to a current input motor command current ($i_q^*$), motor rotation speed ($\omega_m$), and DC-Link voltage ($V_{Link}$); and
a current controller configured to control the current of the motor by controlling an inverter such that a compensation command current ($i_q^*{}_{\_comp}$), which is generated by reflecting the compensation signal ($i_{comp}$) generated by the compensation signal generator in the motor command current ($i_q^*$), coincides with a motor drive current ($i_q$) supplied to the motor from the inverter operated based on the DC-Link voltage.

2. The motor control apparatus according to claim 1, wherein the parameter map is preset in consideration of the frequency response characteristic of the current controller, so as to prevent a gain reduction and phase delay of the compensation signal ($i_{comp}$) reflected in the compensation command current ($i_q^*{}_{\_comp}$) due to the frequency response characteristic of the current controller in a high-speed rotation region of the motor.

3. The motor control apparatus according to claim 2, wherein the parameter map is acquired by, for each motor rotation speed, repeatedly performing:
a process of constantly maintaining the motor rotation speed and the motor command current input to the current controller;
a process of acquiring a phase of a motor torque ripple model when the magnitude of the motor torque ripple, which is measured when the motor torque ripple is modeled to vary the phase of the motor torque ripple model reflected in the motor command current, is minimum; and
a process of acquiring a gain of the motor torque ripple model when the magnitude of the motor torque ripple, which is measured when the gain of the motor torque ripple model is varied while the phase of the motor torque ripple model is kept constant with the acquired phase, is minimum.

4. The motor control apparatus according to claim 2, wherein the first parameter map comprises data for estimating the gain and phase of the motor torque ripple at a lower limit of the DC-Link voltage for normally driving the motor, and the second parameter map comprises data for estimating the gain and phase of the motor torque ripple at an upper limit of the DC-Link voltage for normally driving the motor.

5. The motor control apparatus according to claim 4, wherein the compensation signal generator determines a gain (A) for generating the compensation signal ($i_{comp}$) by extracting a first gain map according to the motor rotation speed from the first parameter map, extracting a second gain map according to the motor rotation speed from the second parameter map, and interpolating the extracted first and second gain maps through the DC-Link voltage ($V_{Link}$).

6. The motor control apparatus according to claim 4, wherein the compensation signal generator determines a phase ($\varphi$) for generating the compensation signal ($i_{comp}$) by interpolating the first and second parameter maps through the DC-Link voltage ($V_{Link}$) in order to consider a change in an intersection of the DC-Link voltage and speed and/or current depending on the change in the DC-Link voltage, and the intersection is a motor rotation speed at which flux weakening control of the motor is started.

7. The motor control apparatus according to claim 6, wherein the compensation signal generator determines the phase ($\varphi$) for generating the compensation signal ($i_{comp}$) by extracting a first phase map according to the motor rotation speed from the first parameter map, extracting a second phase map according to the motor rotation speed from the second parameter map, and interpolating the extracted first and second phase maps through the DC-Link voltage ($V_{Link}$).

8. The motor control apparatus according to claim 7, wherein when the DC-Link voltage ($V_{Link}$) is between the lower limit and the upper limit when the motor rotation speed ($\omega_m$) is in a range between an intersection of the DC-Link voltage and speed and/or current ($NP_{lo}$) of the first phase map and an intersection of the DC-Link voltage and speed and/or current ($NP_{up}$) of the second phase map, the compensation signal generator determines the phase ($\varphi$) for generating the compensation signal ($i_{comp}$) by:
determining a phase value ($\varphi_1$) corresponding to the DC-Link voltage ($V_{Link}$) at the intersection ($NP_{up}$) by linearly interpolating a phase value ($\varphi_{lo}$) at the intersection ($NP_{lo}$) of the first phase map and a phase value ($\varphi_{up}$) at the intersection ($NP_{up}$) of the second phase map through the DC-Link voltage ($V_{Link}$);
determining a phase value ($\varphi_2$) at the point determined by linearly interpolating a phase value ($\varphi_{lo}$) at the intersection ($NP_{lo}$) of the first phase map and a phase value ($\varphi_{up}$) at the intersection ($NP_{up}$) of the second phase map through the DC-Link voltage ($V_{Link}$); and
interpolating the determined phase values ($\varphi_1$ and $\varphi_2$).

9. A motor control method comprising:
applying, by a compensation signal generator applying a DC-Link voltage ($V_{Link}$) for driving a motor to a parameter map preset in order to estimate a gain and phase of a motor torque ripple generated when the motor is driven according to a motor command current and a motor rotation speed for driving the motor, wherein the parameter map is preset to include a first parameter map corresponding to a lower limit of the DC-Link voltage for normally driving the motor and a second parameter map corresponding to an upper limit of the DC-Link voltage for normally driving the motor;

generating, by the compensation signal generator, a compensation signal ($i_{comp}$) for compensating for the motor torque ripple corresponding to a current input motor command current ($i_q^*$), motor rotation speed ($\omega_m$), and DC-Link voltage ($V_{Link}$); and controlling, by a current controller, the current of the motor by controlling an inverter such that a compensation command current ($i_q^*{}_{-comp}$), which is generated by reflecting the compensation signal ($i_{comp}$) generated by the compensation signal generator in the motor command current ($i_q^*$), coincides with a motor drive current ($i_q$) supplied to the motor from the inverter operated based on the DC-Link voltage.

10. The motor control method according to claim 9, wherein the parameter map is preset in consideration of the frequency response characteristic of the current controller, so as to prevent a gain reduction and phase delay of the compensation signal ($i_{comp}$) reflected in the compensation command current ($i_q^*{}_{-comp}$) due to the frequency response characteristic of the current controller in a high-speed rotation region of the motor.

11. The motor control method according to claim 10, wherein the parameter map is acquired by, for each motor rotation speed, repeatedly performing:
  a process of constantly maintaining the motor rotation speed and the motor command current input to the current controller;
  a process of acquiring a phase of a motor torque ripple model when the magnitude of the motor torque ripple, which is measured when the motor torque ripple is modeled to vary the phase of the motor torque ripple model reflected in the motor command current, is minimum; and
  a process of acquiring a gain of the motor torque ripple model when the magnitude of the motor torque ripple, which is measured when the gain of the motor torque ripple model is varied while the phase of the motor torque ripple model is kept constant with the acquired phase, is minimum.

12. The motor control method according to claim 10, wherein the parameter map comprises a first parameter map for estimating the gain and phase of the motor torque ripple at a lower limit of the DC-Link voltage for normally driving the motor, and a second parameter map for estimating the gain and phase of the motor torque ripple at an upper limit of the DC-Link voltage for normally driving the motor.

13. The motor control method according to claim 12, wherein the compensation signal generator applying a DC-Link voltage ($V_{Link}$) for driving a motor to a parameter map comprises the compensation signal generator determining a gain (A) for generating the compensation signal ($i_{comp}$) by extracting a first gain map according to the motor rotation speed from the first parameter map, extracting a second gain map according to the motor rotation speed from the second parameter map, and interpolating the extracted first and second gain maps through the DC-Link voltage ($V_{Link}$).

14. The motor control method according to claim 12, wherein the compensation signal generator applying a DC-Link voltage ($V_{Link}$) for driving a motor to a parameter map comprises the compensation signal generator determining a phase ($\varphi$) for generating the compensation signal ($i_{comp}$) by interpolating the first and second parameter maps through the DC-Link voltage ($V_{Link}$) in order to consider a change in a an intersection of the DC-Link voltage and speed and/or current depending on the change in the DC-Link voltage, the intersection being a motor rotation speed at which flux weakening control of the motor is started.

15. The motor control method according to claim 14, wherein in the compensation signal generator determining a phase ($\varphi$), the compensation signal generator determines the phase ($\varphi$) for generating the compensation signal ($i_{comp}$) by extracting a first phase map according to the motor rotation speed from the first parameter map, extracting a second phase map according to the motor rotation speed from the second parameter map, and interpolating the extracted first and second phase maps through the DC-Link voltage ($V_{Link}$).

16. The motor control method according to claim 15, wherein in the compensation signal generator determining a phase ($\varphi$), when the DC-Link voltage ($V_{Link}$) is between the lower limit and the upper limit when the motor rotation speed ($\omega_m$) is in a range between an intersection of the DC-Link voltage and speed and/or current ($NP_{lo}$) of the first phase map and an intersection of the DC-Link voltage and speed and/or current ($NP_{up}$) of the second phase map, the compensation signal generator determines the phase ($\varphi$) for generating the compensation signal ($i_{comp}$) by:
  determining a phase value ($\varphi_1$) corresponding to the DC-Link voltage ($V_{Link}$) at the intersection ($NP_{up}$) by linearly interpolating a phase value ($\varphi^{lo}$) at the intersection ($NP_{lo}$) of the first phase map and a phase value ($\varphi_{up}$) at the intersection ($NP_{up}$) of the second phase map through the DC-Link voltage ($V_{Link}$);
  determining a phase value ($\varphi_2$) at the point determined by linearly interpolating a phase value ($\varphi_{lo}$) at the intersection ($NP_{lo}$) of the first phase map and a phase value ($\varphi_{up}$) at the intersection ($NP_{up}$) of the second phase map through the DC-Link voltage ($V_{Link}$); and
  interpolating the determined phase values ($\varphi_1$ and $\varphi_2$).

* * * * *